(12) United States Patent
Boehme et al.

(10) Patent No.: US 8,493,236 B2
(45) Date of Patent: Jul. 23, 2013

(54) MOTOR VEHICLE HAVING A PARKING ASSISTANCE SYSTEM

(75) Inventors: Aiko Boehme, Ingelheim (DE); Heiko Bald, Modautal (DE)

(73) Assignee: GM Global Technology Operations LLC, Detroit, MI (US)

( * ) Notice: Subject to any disclaimer, the term of this patent is extended or adjusted under 35 U.S.C. 154(b) by 633 days.

(21) Appl. No.: 12/774,623

(22) Filed: May 5, 2010

(65) Prior Publication Data

US 2010/0289670 A1 Nov. 18, 2010

(30) Foreign Application Priority Data

May 14, 2009 (DE) .......................... 10 2009 021 282

(51) Int. Cl.
*B60Q 1/48* (2006.01)
(52) U.S. Cl.
USPC .................... 340/932.2; 340/435; 340/436
(58) Field of Classification Search
USPC ....................................................... 340/932.2
See application file for complete search history.

(56) References Cited

U.S. PATENT DOCUMENTS

| | | | |
|---|---|---|---|
| 6,477,466 B1 * | 11/2002 | Kocherscheidt et al. | 701/301 |
| 6,836,209 B2 | 12/2004 | Ploucha | |
| 7,109,854 B2 | 9/2006 | Dobler et al. | |
| 7,403,102 B2 | 7/2008 | Fukuda et al. | |
| 2007/0024431 A1* | 2/2007 | Touge | 340/436 |

FOREIGN PATENT DOCUMENTS

| | | |
|---|---|---|
| DE | 10128792 A1 | 11/2002 |
| DE | 10216901 A1 | 11/2003 |
| DE | 102004005225 A1 | 8/2005 |
| DE | 102005046827 A1 | 4/2006 |
| DE | 102006010070 A1 * | 10/2006 |
| EP | 1562054 A2 | 8/2005 |

OTHER PUBLICATIONS

British Patent Office, British Search Report for British Application No. 1007719.6, Sep. 2, 2010.
German Patent Office, German Search Report for German Application No. 102009021282.5, Mar. 25, 2010.
UK IPO, British Examination Report for Application No. 1007719.6, dated Sep. 17, 2012.

* cited by examiner

*Primary Examiner* — Brian Zimmerman
*Assistant Examiner* — Sara Samson
(74) *Attorney, Agent, or Firm* — Ingrassia Fisher & Lorenz, P.C.

(57) ABSTRACT

A motor vehicle is equipped with a parking assistance system for monitoring a vehicle environment for the presence of obstructions, a horizontal longitudinal extension of a mobile vehicle part protruding beyond a vehicle body being able to be considered. In order to reliably avoid damage to the mobile vehicle part, a complete pivot area of the mobile vehicle part can be monitored for the presence of an obstruction. Furthermore, a corresponding method is disclosed.

19 Claims, 2 Drawing Sheets

MOTOR VEHICLE HAVING A PARKING ASSISTANCE SYSTEM

CROSS-REFERENCE TO RELATED APPLICATION

This application claims priority to German Patent Application No. 102009021282.5, filed May 14, 2009, which is incorporated herein by reference in its entirety.

TECHNICAL FIELD

The invention relates to a motor vehicle having a parking assistance system for monitoring a vehicle environment for the presence of obstructions, a horizontal longitudinal extension of a mobile vehicle part protruding beyond a vehicle body being able to be considered, and to a method for monitoring a vehicle environment.

BACKGROUND

Motor vehicles are equipped with a parking assistance system, which monitors the rear area using sensors when parking in reverse, for example, as to whether a stationary or mobile object is located in this area. If the distance to the object, such as a garage wall, falls below a minimum distance, a corresponding warning message is output in order to avoid an impact. However, in the parked state, the motor vehicle can be located so close to the garage wall that, for example, a rear hatch which pivots upward on a minivan, for example, cannot be opened or can no longer be opened completely, because there is no longer sufficient space to pivot up the rear hatch.

An obstruction recognition system is known from U.S. Pat. No. 7,403,102 B2, in which the horizontal extension of a tailgate of a pickup truck, which can be pivoted downward, can be taken into consideration when ascertaining a minimum required distance to an obstruction. Thus, even when the rear hatch is closed, a minimum distance to a garage wall, for example, can be maintained, in order to nonetheless still be able to fold down the tailgate without damage.

Furthermore, DE 102 16 901 A1 discloses a protective unit on a motor vehicle having an adjustable vehicle part. For example, if a convertible top is to be opened on a stationary cabriolet using a motor, it can be checked using sensors whether the pivot area of the cabriolet top, i.e., essentially an area above the motor vehicle, is free of obstructions in order to avoid damage. If not, automatic adjustment of the vehicle part is not performed.

The known motor vehicles are disadvantageous in that only a horizontal distance can be checked for sufficient clearance when parking and only the area above the cabriolet top can be checked as to whether it is free of obstructions in the case of a stationary motor vehicle.

It is at least one object to provide a motor vehicle of the type cited at the beginning in which a parking procedure is executable in such a manner that the mobile vehicle part, such as a rear hatch, can be opened without the danger of damage in the parked state of the motor vehicle. A method for monitoring a vehicle environment is also to be disclosed. Furthermore, other objects, desirable features, and characteristics will become apparent from the subsequent summary and detailed description, and the appended claims, taken in conjunction with the accompanying drawings and this background.

SUMMARY

The at least one object, other objects, desirable features, and characteristics are achieved in the case of the motor vehicle in that a complete pivot area of the mobile vehicle part can be monitored for the presence of an obstruction. According to the method, the at least one object, other objects, desirable features, and characteristics are achieved in that a complete pivot area of the mobile vehicle part is monitored for the presence of an obstruction.

In the case of a motor vehicle implemented in this manner, a parking assistance system which is arbitrarily designed per se is provided, for example, which monitors a rear area behind the motor vehicle for the presence of obstructions when parking and outputs visual and/or acoustic warning messages in a way known per se upon approach to an obstruction.

Sensors of the parking assistance system for monitoring an area are implemented and situated so that not only a horizontal distance to an obstruction, for example, to a garage wall, can be monitored, but rather also a complete pivot area of the mobile vehicle part, which extends beyond the actual vehicle body. In particular, a height of the obstruction can be detected in order to be able to check automatically whether the obstruction protrudes into a pivot area. Obstructions of this type which only protrude into a pivot area at a distance from the ground may be detected, for example, a front area of an already parked motor vehicle located behind the parking motor vehicle. The scope of the invention also comprises, for example, a rear hatch being able to be pivoted around a rotational axis oriented essentially vertically or horizontally and protruding downward and/or upward, as well as linear movements of a sliding door on one side of a motor vehicle, for example, or other movements or displacements of a mobile vehicle part, inter alia, a convertible top which can be collapsed or folded. This entire area is monitored by the sensors as to whether it is free of obstructions, in order to be able to move the mobile vehicle part without the danger of damage after parking the motor vehicle. For example, a side view of the motor vehicle having an obstruction which lights up in red in the pivot area of the rear hatch can be shown on a display in the dashboard of the motor vehicle as a warning message. Warning beeping or peeping tones are also possible.

At least one advantage of the invention is that typically only sensors already provided in the motor vehicle must be appropriately activated and/or oriented in order to monitor the entire desired area. Ultrasound, radar, or infrared sensors may be used for the monitoring of a desired area using sensors. Furthermore, the dimensions of the vehicle body and the pivot areas of various mobile vehicle parts are stored either in the parking assistance system or in a central control unit, in order to be able to monitor sufficiently large areas having sufficient safety distance using sensors.

The parking assistance system preferably comprises an optical acquisition unit, in particular an LCD camera, which is optionally pivotable, and an image processing system for monitoring the vehicle environment for the presence of obstructions. The image acquired by the acquisition unit, in particular a reversing camera, can be analyzed by the image processing system for the presence of obstructions. Both a horizontal distance to the obstruction and also its overall height and/or a distance to the ground are preferably acquired and compared to the dimensions for the pivot area, such as a rear hatch, stored in a control unit.

Advantageously, further add-on parts which cannot be pivoted or displaced can also be taken into consideration during the monitoring for the presence of obstructions. These may be, for example, spare tires attached to the rear, a bicycle rack, a roof box mounted on a roof luggage rack, or the like. If such an additional add-on part is present, it can either be automatically detected by the motor vehicle using sensors or predefined by the user, whereby the corresponding monitored areas are enlarged.

For example, if the rear hatch is pivoted upward, the pivot area can also be monitored by the parking assistance system as to whether it is free of obstructions and a person is not located in front of the open luggage compartment, for example, before the rear hatch is closed. If this is established, the pivoting or closing of this mobile vehicle part can be blocked, in order to avoid injuries to the person.

According to a refinement, before the actual pivoting of the mobile vehicle part, i.e., for example, folding a rear hatch upward, the pivot area is again monitored as to whether it is actually free of obstructions. This monitoring can already have been performed during parking, but a longer period of time may have passed between the parking procedure and the actual opening, and an obstruction may have entered the pivot area during this time. The movement of the vehicle part can also be blocked upon the presence of an obstruction in this case.

If the driver intentionally wishes to reduce the distance to a rear garage wall, for example, below the minimum distance, because the motor vehicle otherwise does not fit in the garage or a parking space, a visual and/or acoustic warning message can be output, for example, a speech message: "please do not open rear hatch". Of course, further visual and/or warning messages will subsequently be output upon the further approach to the extraction, in order to avoid a collision.

A pivot area of a rear hatch is preferably monitored, independently of whether it is pivotable around a vertical or horizontal axis. In particular in the case of minivans having a rear hatch attached at the top to the vehicle body and pivoting upward, for example, this pivot area is to be monitored in underground garages or parking structures as to whether pipelines of a ventilation facility or the like run there. In the same way, a pivot area of a door, such as a driver, passenger, or rear door, and the pivot area of a convertible top can be monitored.

For example, if it is established by the parking assistance system for a rear hatch that complete pivoting upward is not possible without damaging the rear hatch, the pivot route is also automatically limited, in order to be able to pivot the rear hatch upward only partially.

In a further embodiment, in the case of a parking assistance system which executes the parking procedure itself having the various steering movements and forward and reverse travel after automatically detecting a sufficiently large parking space, it is predefined by the user beforehand that either only an adequately dimensioned parking space is approached, in order to be able to still pivot the rear hatch upward, for example, or the vehicle must drive far enough forward in a parking space so that the rear hatch is pivotable upward.

If the vehicle is equipped with an automatic leveling system, the vehicle body can also be automatically lowered to achieve a sufficient clearance, in particular on top.

The above-mentioned features and the features that are still to be explained hereafter are usable not only in the particular disclosed combination, but rather also in other combinations.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
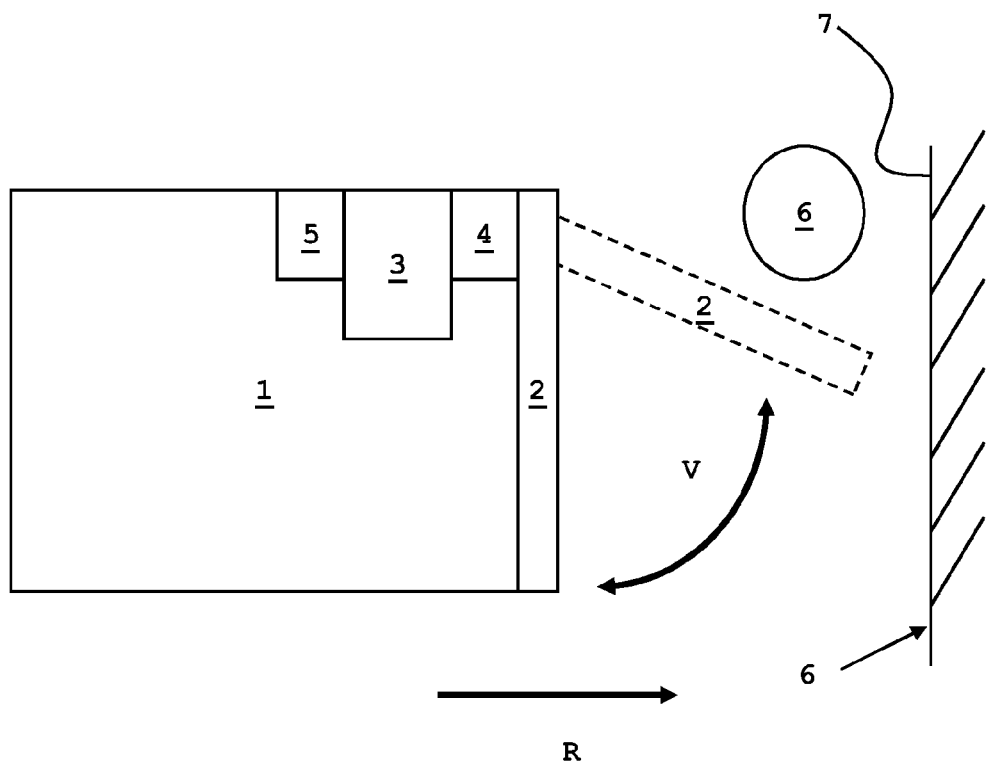
FIG. 1 shows a motor vehicle according to an embodiment of the invention in a schematic side view.

The following detailed description is merely exemplary in nature and is not intended to limit application and uses. Furthermore, there is no intention to be bound by any theory presented in the preceding background or summary or the following detailed description.

The motor vehicle 1, such as a minivan, is equipped with a rear hatch 2 to which can be pivoted from a vertically oriented closed position into an open position according to the double arrow V. In the open illustration shown by dashed lines, the rear hatch 2 protrudes far beyond the actual vehicle body of the motor vehicle 1 and accordingly could collide with an obstruction 6 present in this pivot area.

Furthermore, the motor vehicle 1 is equipped with a parking assistance system 3, which monitors, inter alia, the rear vehicle area for the presence of an obstruction 6 using a sensor 4. The sensor 4 is implemented as an ultrasound sensor 8 and is situated in the lower rear area. Visual and/or acoustic warning messages are output via an output device 5, such as a loudspeaker and/or a display in the dashboard of the motor vehicle 1. Driving into a garage wall 7 can thus be avoided when parking in reverse gear R.

Furthermore, the entire pivot area of the rear hatch 2 is monitored by the parking assistance system 3 for the presence of obstructions and if the obstruction 6 is present, corresponding visual and/or acoustic warning messages are also output. This means that the motor vehicle 1 is only to park in reverse far enough that it is possible to fold up the rear hatch 2 without collision with the obstruction 6, such as a ventilation pipe in an underground garage.

Figure 2:
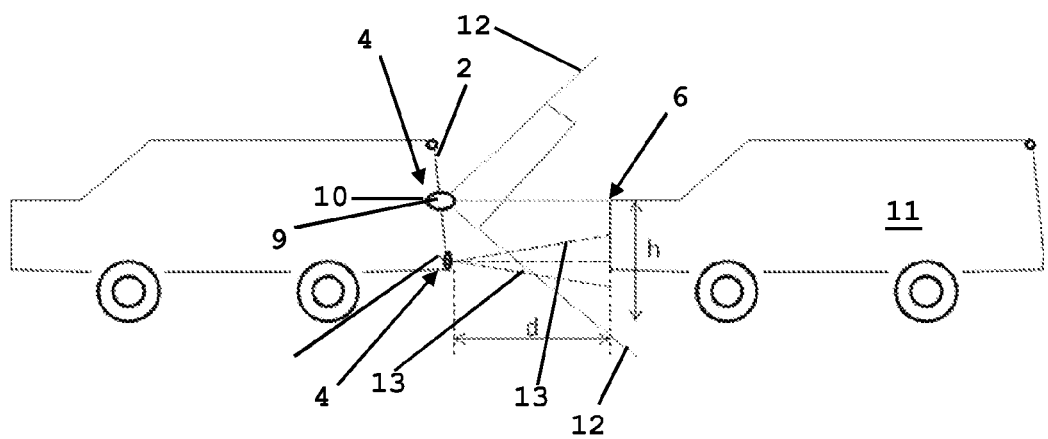
FIG. 2 shows a schematic side view of a motor vehicle according to FIG. 1 in an alternative embodiment.
Figure 3:
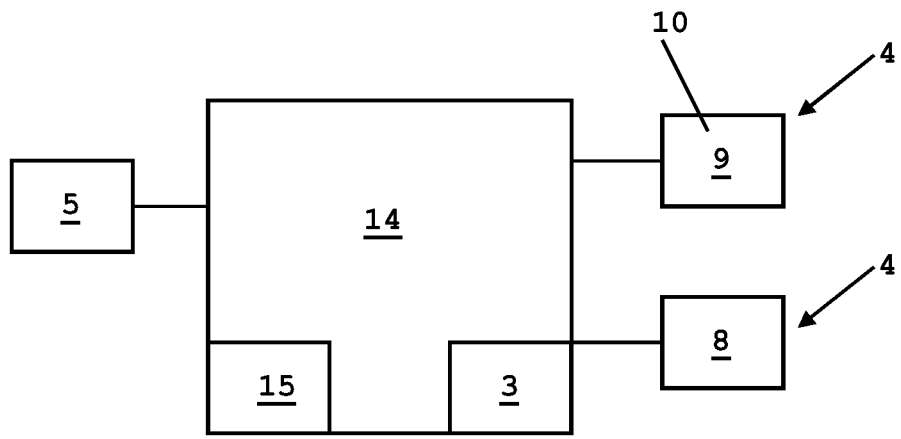
FIG. 3 shows a block diagram of the motor vehicle according to FIG. 2.
Figure 4:
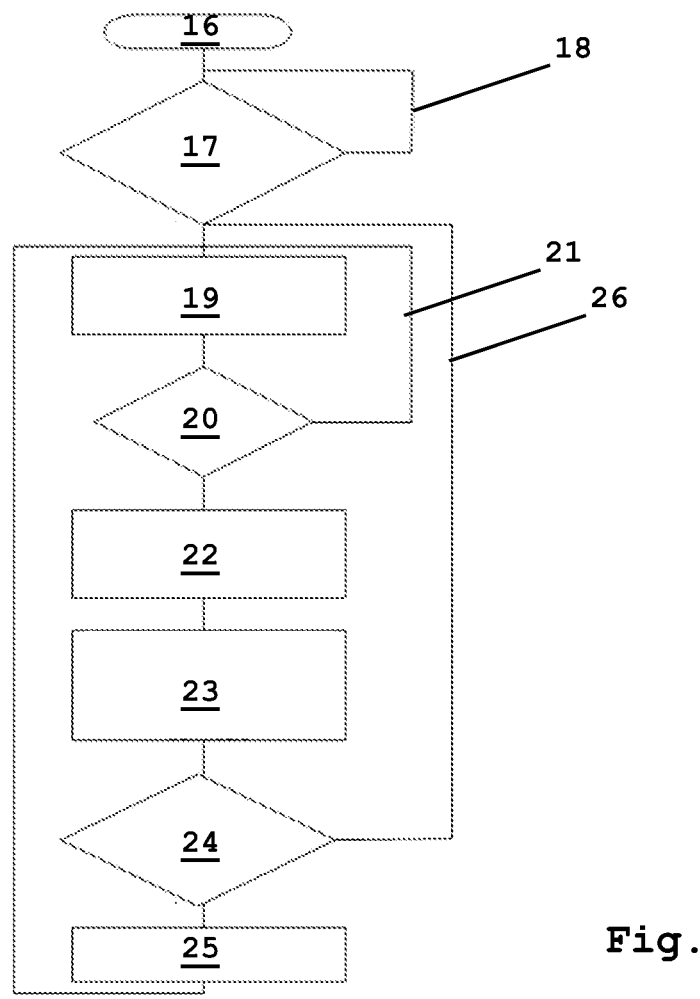
FIG. 4 shows a flowchart of a method according to an embodiment of the invention.

According to FIG. 2, in addition to the ultrasound sensor 8 situated in the lower rear area, a further sensor 4 is provided, which is implemented as an optical acquisition unit 9, namely an LCD camera 10, in order to acquire a height of an obstruction 6, such as a vehicle body edge of a vehicle 11 parked to the rear. Alternatively, the further sensor 4 can in turn be implemented as an ultrasound sensor or as a radar sensor and can be situated in a rear area above the ultrasound sensor 8. The LCD camera 10 is connected to an image processing unit and has an acquisition area restricted by the lines 12, while the acquisition area of the ultrasound sensor 8 is essentially delimited by the dashed lines 13.

The parking assistance system 3 is part of an electronic control unit 14, which is connected to both the sensors 4 and also the output device 5 and comprises a memory module 15, in which data of the geometry of the rear hatch 2 are stored.

The flowchart begins with the start box 16 and it is established in a first query box 17 whether or not the parking assistance system 3 is activated. If the parking assistance system is deactivated, a jump backward is performed according to line 18. If the parking assistance system 3 is activated, a distance d to the obstruction 6 is determined according to box 19 using the ultrasound sensor 8. The measured distance d is compared in a query box 20 to a value, which corresponds to the opening radius of the rear hatch 2, i.e., essentially its length from a hinge up to the free end, stored in the memory module 15. If the distance d is less than the dimension of the opening radius, a jump backward to the box 19 is performed according to line 21, in order to perform a further measurement of the distance d. Simultaneously, the driver is informed according to box 25 using the output device 5. If the distance d is greater than the dimension of the opening radius, a height h of the obstruction 6 is determined in a box 22 using the LCD camera and the image processing unit. In a calculation box 23, it is established on the basis of the geometry data stored in the memory module 15 whether the measured data describe a point in the pivot area of the rear hatch 2. It is established in the following query box 24 whether the obstruction 6 obstructs the opening of the rear hatch 2. If there is an obstruction, a jump back to the box 19 is performed according to line 26, in order to perform a further measurement of the distance d, and the driver is simultaneously informed correspondingly using the output device 5 according to box 25. If the obstruction 6 is located outside the pivot area of the rear hatch 2, the driver is correspondingly informed according to box 25.

Of course, the opening area of side doors or the pivot area of a cabriolet top can also be monitored for the presence of obstructions when parking, in order to be able to move all mobile vehicle parts harmlessly in the stationary state of the motor vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
    a horizontal longitudinal extension of a mobile vehicle part protruding beyond a body of the motor vehicle and pivotable within a pivot area;
    a parking assistance system comprising a first sensor in a lower rear area of the motor vehicle, the first sensor configured to detect a horizontal distance between an obstruction and the horizontal longitudinal extension, the parking assistance system further comprising a second sensor configured to determine a height of the obstruction,
    wherein the parking assistance system is configured to determine when the obstruction obstructs the pivot area of the horizontal longitudinal extension based on the horizontal distance and the height; and
    an output device adapted to generate a warning when the obstruction obstructs the pivot area.

2. The motor vehicle according to claim 1, wherein the the second sensor is an optical acquisition unit and the parking assistance system includes an image processing system adapted to monitor a vehicle environment for the presence of the obstruction.

3. The motor vehicle according to claim 2, wherein the optical acquisition unit is situated in the mobile vehicle part.

4. The motor vehicle according to claim 1, wherein, when the mobile vehicle part is pivoted up, the parking assistance system is configured to monitor of the pivot area.

5. The motor vehicle according to claim 1, wherein the mobile vehicle part is a rear hatch.

6. The motor vehicle according to claim 1, wherein the mobile vehicle part is a door.

7. The motor vehicle according to claim 1, wherein the mobile vehicle part is a convertible top.

8. The motor vehicle according to claim 1, wherein the mobile vehicle part has a pivot limiter.

9. The motor vehicle according to claim 1, wherein a clearance can be predefined in a case of a self-parking parking assistance system.

10. The motor vehicle according to claim 1, wherein a leveling system can be activated to achieve a sufficient clearance.

11. A method for monitoring a vehicle environment of a motor vehicle equipped with a parking assistance system for detecting a presence of an obstruction, a horizontal longitudinal extension of a mobile vehicle part protruding beyond a body of the motor vehicle and pivotable within a pivot area, comprising the steps of:
    monitoring, with a first sensor of the parking assistance system, a horizontal distance between the horizontal longitudinal extension and the obstruction;
    monitoring, with a second sensor of the parking assistance system, a height of the obstruction;
    monitoring the pivot area of the mobile vehicle part for detecting the presence of the obstruction within the pivot area based on the horizontal distance and the height; and
    generating a warning if during the monitoring the obstruction is detected within the pivot area.

12. The method according to claim 11, wherein the pivot area is monitored using an image acquisition system as the second sensor.

13. The method according to claim 11, further comprising the step of monitoring of the pivot area when the mobile vehicle part is pivoted.

14. The method according to claim 11, wherein the mobile vehicle part is a rear hatch.

15. The method according to claim 11, wherein the mobile vehicle part is a door.

16. The method according to claim 11, wherein the mobile vehicle part is a convertible top.

17. The method according to claim 11, further comprising the step of limiting a pivot of the mobile vehicle part.

18. The method according to claim 11, further comprising the step of predefining a required clearance in a case of a self-parking parking assistance system.

19. The method according to claim 11, further comprising the step of activating a leveling system to achieve a sufficient clearance.

* * * * *